US009961126B2

United States Patent
Ben-Harrush et al.

(10) Patent No.: US 9,961,126 B2
(45) Date of Patent: May 1, 2018

(54) MANAGING DATA ACCESS ON A COMPUTING DEVICE

(71) Applicant: International Business Machines Corporation, Armonk, NY (US)

(72) Inventors: Idan Ben-Harrush, Givat Elah (IL); Ran Bernstein, Haifa (IL); Nili Guy Ifergan, Haifa (IL); Gal Shachor, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 14/698,859

(22) Filed: Apr. 29, 2015

(65) Prior Publication Data

US 2016/0323414 A1   Nov. 3, 2016

(51) Int. Cl.
  *H04L 29/08*  (2006.01)
  *H04L 29/06*  (2006.01)
  *G06F 17/30*  (2006.01)

(52) U.S. Cl.
  CPC .............. *H04L 67/02* (2013.01); *G06F 17/30* (2013.01); *H04L 67/289* (2013.01); *H04L 67/2842* (2013.01)

(58) Field of Classification Search
  CPC . H04L 67/02; H04L 67/2852; H04L 67/2823; H04L 67/2842; H04L 67/289; G06F 17/30; G06F 17/30861; G06F 17/30902
  USPC ........................................................ 709/225
  See application file for complete search history.

(56) References Cited

U.S. PATENT DOCUMENTS

| | | | | |
|---|---|---|---|---|
| 8,626,919 B1* | 1/2014 | Papakipos | ........... | G06F 9/44521 709/226 |
| 8,793,341 B2 | 7/2014 | Cheng et al. | | |
| 8,887,178 B1* | 11/2014 | Browne | ................... | G06F 9/54 719/319 |
| 9,288,256 B2* | 3/2016 | Goodwin | ............ | H04L 67/2847 |
| 9,448,776 B1* | 9/2016 | Sankaran | .......... | G06F 17/30893 |
| 2007/0101061 A1* | 5/2007 | Baskaran | .......... | G06F 17/30902 711/118 |
| 2008/0091800 A1 | 4/2008 | Sorrentino et al. | | |
| 2010/0017461 A1* | 1/2010 | Kokkevis | ............ | G06F 9/44526 709/203 |

(Continued)

OTHER PUBLICATIONS

Disclosed Anonymously., "Mobilizing an Existing Web Application: Method of Runtime Code Adaptation", An IP.com Prior Art Database Technical Disclosure, Dec. 5, 2012.

(Continued)

*Primary Examiner* — Ruolei Zong
(74) *Attorney, Agent, or Firm* — Don Swirsky

(57) ABSTRACT

Managing data access on a computing device by receiving at a first computing device first webpage-related content received from a second computing device via a communications network, storing the first webpage-related content in a locally-accessible data storage medium that is locally accessible to the first computing device, causing an agent executed by the first computing device to access the first webpage-related content from the locally-accessible data storage medium, intercepting an attempt by the agent to receive second webpage-related content via the communications network, and providing the second webpage-related content to the agent from the locally-accessible data storage medium.

16 Claims, 4 Drawing Sheets

(56) References Cited

U.S. PATENT DOCUMENTS

| | | | |
|---|---|---|---|
| 2010/0161717 A1* | 6/2010 | Albrecht | H04L 67/2852 709/203 |
| 2012/0117644 A1* | 5/2012 | Soeder | G06F 21/6227 726/22 |
| 2012/0159308 A1* | 6/2012 | Tseng | G06F 9/4443 715/234 |
| 2012/0233199 A1* | 9/2012 | Jenkins | H04L 29/08729 707/769 |
| 2013/0174012 A1 | 7/2013 | Kwan et al. | |
| 2014/0089786 A1 | 3/2014 | Hashmi | |
| 2014/0095589 A1* | 4/2014 | Johnson | H04L 67/42 709/203 |
| 2014/0281859 A1* | 9/2014 | Burckart | G06F 17/2235 715/205 |
| 2014/0281905 A1 | 9/2014 | Burckart et al. | |
| 2015/0032803 A1* | 1/2015 | Graham-Cumming | H04L 67/2828 709/203 |

OTHER PUBLICATIONS

Jo Rabin., "Guidelines for Web Content Transformation Proxies 1.0", W3C Working Group Note, Oct. 26, 2010.

* cited by examiner

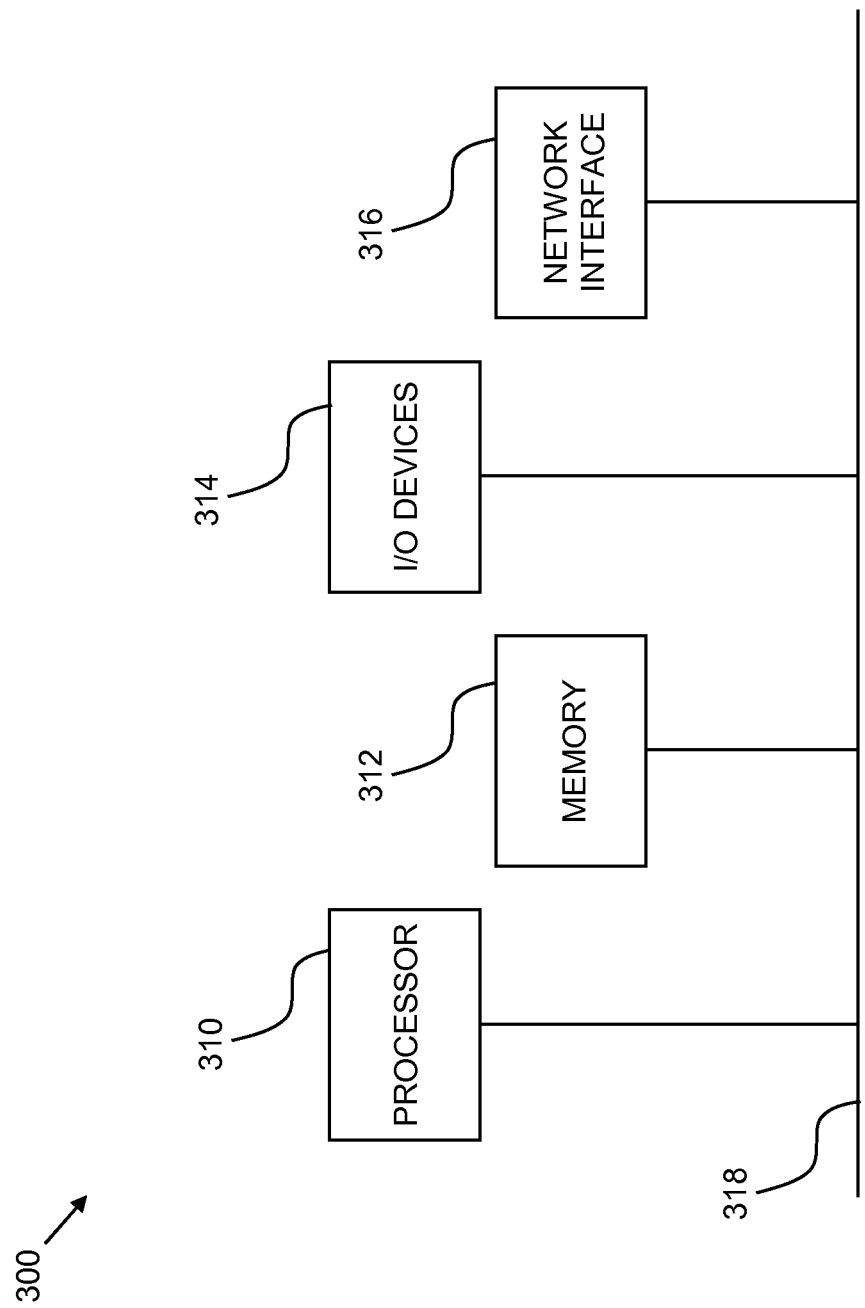

MANAGING DATA ACCESS ON A COMPUTING DEVICE

BACKGROUND

Many legacy web applications, such as those employing the JavaServer Pages™ (JSP) architecture, require the use of a web browser on a client computer to request a web page from a web application server, whereupon the web application server dynamically generates the web page and sends the web page to the client computer's web browser. The web page often has links to other static content stored on the web application server, which static content the client computer's web browser requests as well. While mobile computing devices may be used when interacting with such legacy web applications, the way that such legacy web applications provide access to their data is often unsuited to mobile computing devices given their bandwidth limitations.

SUMMARY

In one aspect of the invention a method is provided for managing data access on a computing device, the method including receiving at a first computing device first webpage-related content received from a second computing device via a communications network, storing the first webpage-related content in a locally-accessible data storage medium that is locally accessible to the first computing device, causing an agent executed by the first computing device to access the first webpage-related content from the locally-accessible data storage medium, intercepting an attempt by the agent to receive second webpage-related content via the communications network, and providing the second webpage-related content to the agent from the locally-accessible data storage medium.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION

Figure 1A:
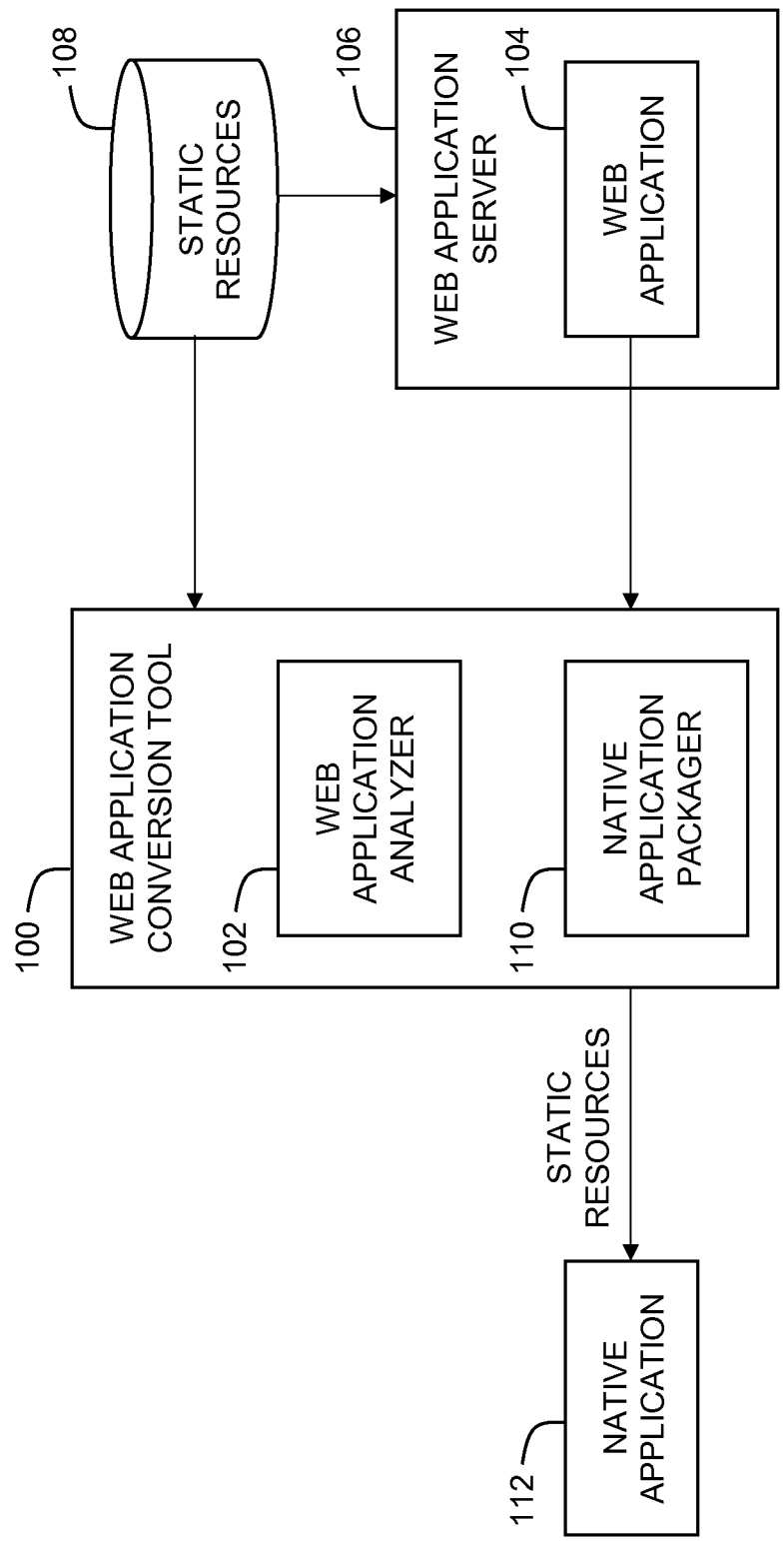
FIGS. 1A and 1B, taken together, is a simplified conceptual illustration of a system for managing data access on a computing device, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
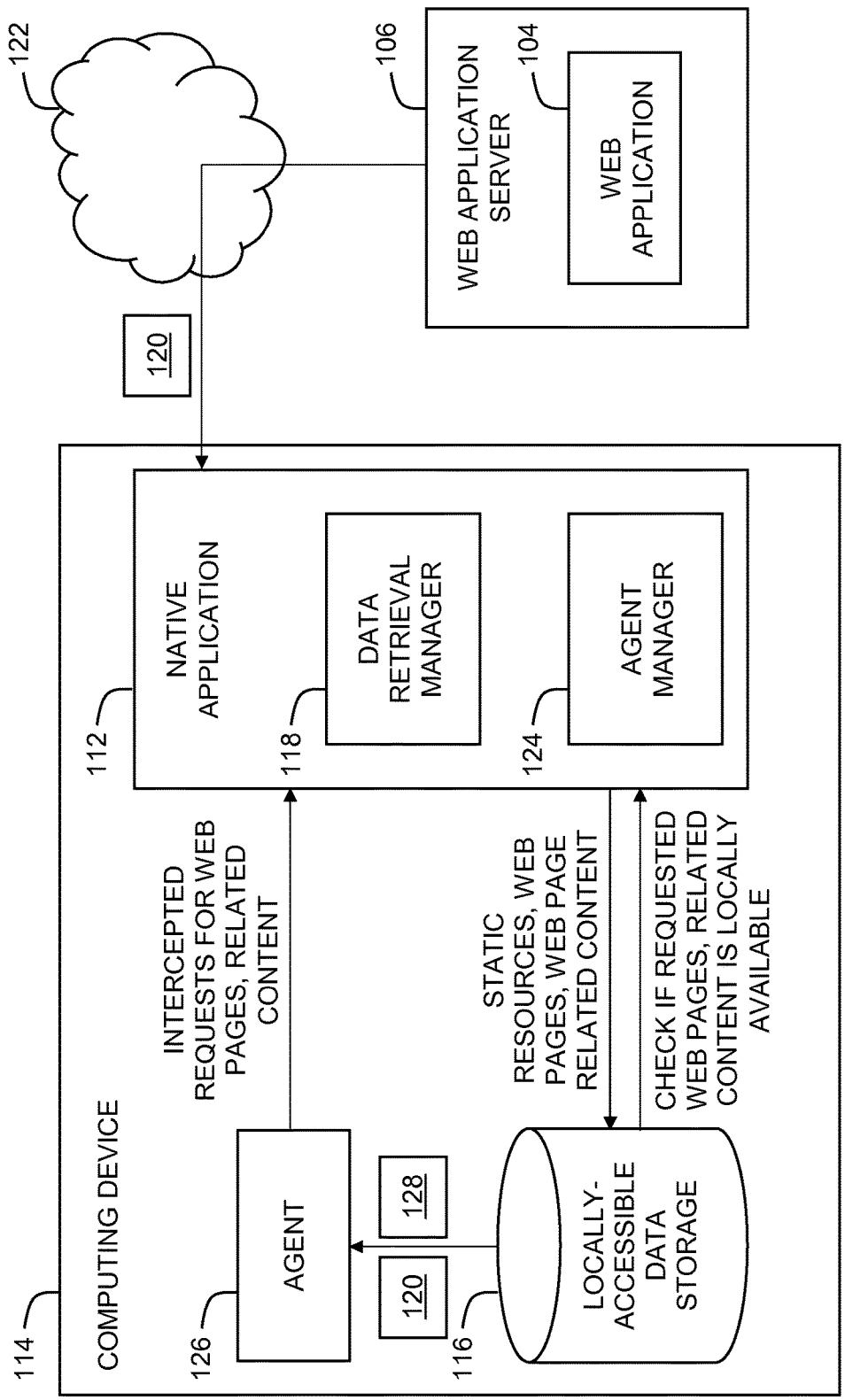

Reference is now made to FIGS. 1A and 1B which, taken together, is a simplified conceptual illustration of a system for managing data access on a computing device, constructed and operative in accordance with an embodiment of the invention. In the system of FIGS. 1A and 1B a web application conversion tool 100 includes a web application analyzer 102 that is configured to analyze a web application 104, such as a JavaServer Pages™ (JSP) application that is hosted by a web application server 106, using conventional techniques to identify static resources 108 of web application 104, such as image files, Cascading Style Sheets (CSS), and JavaScript™ files. Web application conversion tool 100 also includes a native application packager 110 that is configured to package static resources 108 into a native application 112 using conventional techniques, such as for installation onto, and execution by, a computing device 114, which may, for example, be a mobile telephone or other mobile computing device. During the installation of native application 112 onto computing device 114, static resources 108 are stored in a locally-accessible data storage medium 116, being any known data storage medium that is assembled with computing device 114, or that is otherwise locally accessible thereto.

Native application 112 includes a data retrieval manager 118 configured to request a web page 120, such as from web application server 106 which may generate web page 120 dynamically, and receive web page 120 at computing device 114, such as where both the request and the receipt are made via a communications network 122, such as a computer network such as the Internet, or a cellular data network with access to a computer network. Native application 112 then stores web page 120 in locally-accessible data storage medium 116.

Native application 112 also includes an agent manager 124 configured to cause an agent 126, that is also executed by computing device 114, to access web page 120 from locally-accessible data storage medium 116, such as where agent 126 is a mobile webview component, such as an Android™ WebView or Apple™ UIWebView component. Agent manager 124 is also configured, using conventional techniques such as hooking, to intercept, and thereby prevent, attempts by agent 126 to receive additional webpage-related content 128 directly via communications network 122, such as additional web pages or content linked to by web page 120 or by any other web pages accessed by agent 126. Data retrieval manager 124 then determines whether retrieval of webpage-related content 128 via communications network 122 is required, such as by determining whether webpage-related content 128 is present in locally-accessible data storage medium 116, and preferably also by determining whether there is an indication that webpage-related content 128 is dynamic content that is to be generated in response to a content retrieval request, or is "stale" static content that has changed or expired since it was last acquired. If it is determined that retrieval of webpage-related content 128 via communications network 122 is required, data retrieval manager 124 requests and receives webpage-related content 128 via communications network 122 and stores webpage-related content 128 in locally-accessible data storage medium 116. Alternatively, webpage-related content 128 may already be present in locally-accessible data storage medium 116, such as where webpage-related content 128 was previously retrieved by data retrieval manager 124 and stored in locally-accessible data storage medium 116, or where webpage-related content 128 was part of static resources 108 that was packaged with native application 112 and then stored in locally-accessible data storage medium 116 when native application 112 was installed on computing device 114. Once it is determined that retrieval of webpage-related content 128 via communications network 122 is not required, such as where webpage-related content 128 is present in locally-accessible data storage medium 116, and preferably is also not dynamic or stale content, agent manager 124 causes agent 126 to access webpage-related content 128 from locally-accessible data storage medium 116, such as by serving webpage-related content 128 to agent 126.

Any of the elements shown in FIGS. 1A and 1B are preferably implemented by one or more computers in computer hardware and/or in computer software embodied in a non-transitory, computer-readable medium in accordance with conventional techniques.

Figure 2:
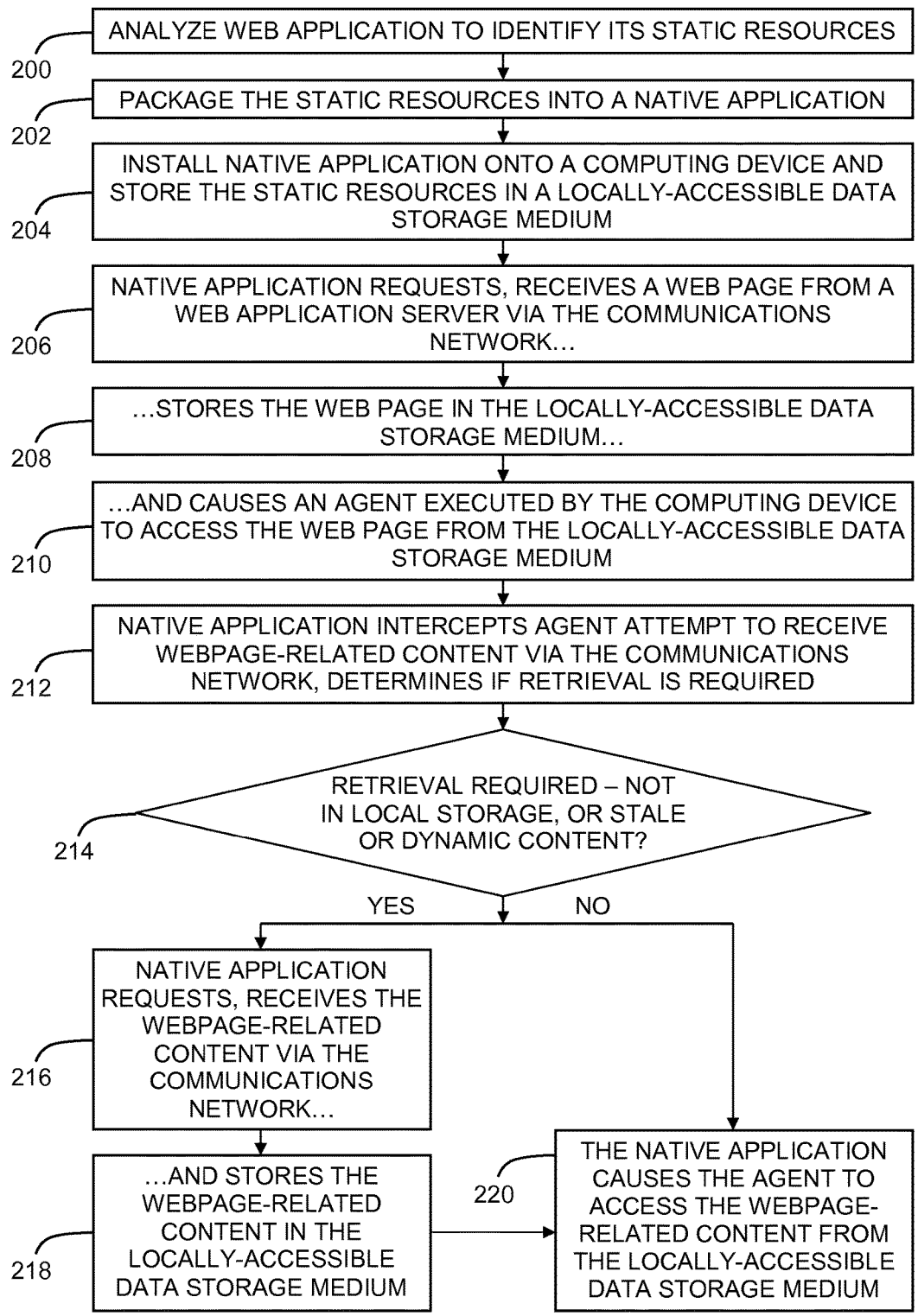
FIG. 2 is a simplified flowchart illustration of an exemplary method of operation of the system of FIGS. 1A and 1B, operative in accordance with an embodiment of the invention.

Reference is now made to FIG. 2 which is a simplified flowchart illustration of an exemplary method of operation of the system of FIGS. 1A and 1B, operative in accordance with an embodiment of the invention. In the method of FIG. 2, a web application is analyzed to identify static resources of the web application, such as image files, Cascading Style Sheets (CSS), and JavaScript™ files (step 200). The static resources are packaged into a native application for installation onto, and execution by, a computing device, which may, for example, be a mobile telephone or other mobile computing device (step 202). During the installation of the native application onto the computing device, the static resources are stored in a locally-accessible data storage medium, being any known data storage medium that is locally accessible to the computing device (step 204). During its execution by its host computing device, the native application requests a web page, such as from a web application server which may generate the web page dynamically, and receives the web page, where both the request and the receipt are made via a communications network (step 206). The native application then stores the web page in the locally-accessible data storage medium (step 208). The native application causes an agent, such as a mobile webview component, that is also executed by the computing device to access the web page from the locally-accessible data storage medium (step 210). After intercepting an attempt by the agent to receive additional webpage-related content via the communications network, such as additional web pages or content linked to by the web page or any other web pages accessed by the agent, the native application determines whether retrieval of the webpage-related content via the communications network is required, such as by determining whether the webpage-related content is present in the locally-accessible data storage medium, and preferably also whether the webpage-related content is dynamic or stale content (step 212). If the retrieval of the webpage-related content via the communications network is required, such as where the webpage-related content is absent from the locally-accessible data storage medium, or is dynamic or stale content (step 214), the native application requests and receives the webpage-related content via the communications network (step 216), stores the webpage-related content in the locally-accessible data storage medium (step 218), and causes the agent to access the webpage-related content from the locally-accessible data storage medium (step 220). If retrieval of the webpage-related content via the communications network is not required, such as where the webpage-related content is present in the locally-accessible data storage medium, and preferably is also not dynamic or stale content, the native application causes the agent to access the webpage-related content from the locally-accessible data storage medium (step 220).

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing data access on a computing device, comprising:
   receiving at a first computing device, comprising a mobile computing device, first webpage-related content within a native application received from a second computing device via a communications network;
   storing the first webpage-related content in a locally-accessible data storage medium that is assembled with the first computing device;
   causing a webview agent executed by the first computing device to access the first webpage-related content from the locally-accessible data storage medium;
   intercepting a request by the webview agent to receive second webpage-related content indicated by a link included in the request, via the communications network, wherein the intercepting is performed by the native application in which the webpage-related content was provided to the first computing device; and
   providing the second webpage-related content to the webview agent from the locally-accessible data storage medium.

2. The method of claim 1 and further comprising:
   determining whether retrieval of the second webpage-related content via the communications network is required; and
   if retrieval of the second webpage-related content via the communications network is required,
      receiving the second webpage-related content via the communications network, and
      storing the second webpage-related content in the locally-accessible data storage medium that is assembled with the first computing device.

3. The method of claim 2 wherein the determining comprises determining whether the second webpage-related content is present in the locally-accessible data storage medium that is assembled with the first computing device.

4. The method of claim 2 wherein the determining comprises determining whether there is an indication that the second webpage-related content is dynamic content that is to be generated in response to a content retrieval request.

5. The method of claim 2 wherein the determining comprises determining whether there is an indication that the second webpage-related content has changed or expired since it was last acquired.

6. The method of claim 1 wherein the providing comprises serving the second webpage-related content to the webview agent.

7. The method of claim 1 wherein the providing comprises causing the webview agent to access the second webpage-related content from the locally-accessible data storage medium that is assembled with the first computing device.

8. The method of claim 1 and further comprising configuring the native application prior to its execution by the first computing device by
identifying static resources of a web application including the first webpage-related content and the second webpage-related content; and
packaging the native application together with the static resources.

9. A mobile computing device, comprising:
a processor connected to a communications network; and
a memory, configured with a webview agent configured to access webpage-related content in the memory, and the memory further storing a native application including first webpage-related content, wherein the native application is configured to:
store the first webpage-related content in the memory,
intercept a request by the webview agent to receive second webpage-related content indicated by a link included in the request, via the communications network, and
provide the second webpage-related content to the webview agent from the memory.

10. The mobile computing device of claim 9 wherein the native application is configured to
determine whether retrieval of the second webpage-related content via the communications network is required; and
if retrieval of the second webpage-related content via the communications network is required,
receive the second webpage-related content via the communications network, and
store the second webpage-related content in the memory.

11. The mobile computing device of claim 10 wherein the native application is configured to determine whether the second webpage-related content is present in the memory.

12. The mobile computing device of claim 10 wherein the native application is configured to determine whether there is an indication that the second webpage-related content is dynamic content that is to be generated in response to a content retrieval request.

13. The mobile computing device of claim 10 wherein the native application is configured to determine whether there is an indication that the second webpage-related content is has changed or expired since it was last acquired.

14. The mobile computing device of claim 9 wherein the native application is configured to serve the second webpage-related content to the webview agent.

15. The mobile computing device of claim 9 wherein the native application is configured to cause the webview agent to access the second webpage-related content from the memory.

16. The method of claim 1, wherein intercepting the request by the webview agent to receive second webpage-related content via the communications network comprises intercepting using hooking.

* * * * *